United States Patent
Kim et al.

(10) Patent No.: US 11,840,629 B2
(45) Date of Patent: Dec. 12, 2023

(54) POLYALKYLENE CARBONATE-BASED RESIN, AND METHOD OF PREPARING THE SAME

(71) Applicant: LG CHEM, LTD., Seoul (KR)

(72) Inventors: Sung Kyoung Kim, Daejeon (KR); Seung Young Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 247 days.

(21) Appl. No.: 17/254,353

(22) PCT Filed: Jan. 9, 2020

(86) PCT No.: PCT/KR2020/000422
§ 371 (c)(1),
(2) Date: Dec. 21, 2020

(87) PCT Pub. No.: WO2020/145699
PCT Pub. Date: Jul. 16, 2020

(65) Prior Publication Data
US 2021/0246305 A1    Aug. 12, 2021

(30) Foreign Application Priority Data

Jan. 11, 2019 (KR) .................. 10-2019-0004135

(51) Int. Cl.
| | | |
|---|---|---|
| C08L 69/00 | (2006.01) | |
| C08L 67/04 | (2006.01) | |
| C08G 64/02 | (2006.01) | |
| C08J 3/09 | (2006.01) | |

(52) U.S. Cl.
CPC .......... *C08L 69/00* (2013.01); *C08G 64/0208* (2013.01); *C08J 3/095* (2013.01); *C08L 67/04* (2013.01); C08L 2201/08 (2013.01); C08L 2203/16 (2013.01); C08L 2203/30 (2013.01)

(58) Field of Classification Search
CPC ...... C08L 69/00; C08L 67/04; C08L 2201/08; C08L 2203/16; C08G 63/08; C08J 3/126; C08J 2467/04; C08J 5/18
See application file for complete search history.

(56) References Cited

U.S. PATENT DOCUMENTS

| | | |
|---|---|---|
| 2015/0132578 A1 | 5/2015 | Tong et al. |
| 2016/0145431 A1 | 5/2016 | Cho et al. |
| 2016/0177088 A1 | 6/2016 | Cho et al. |
| 2018/0305542 A1 | 10/2018 | Lee et al. |
| 2019/0010282 A1 | 1/2019 | Kim et al. |

FOREIGN PATENT DOCUMENTS

| | | | |
|---|---|---|---|
| CN | 104271637 A | | 1/2015 |
| CN | 105051108 A | | 11/2015 |
| CN | 105531320 A | | 4/2016 |
| CN | 108603020 A | | 9/2018 |
| JP | 2005329557 A | * | 12/2005 |
| JP | 2005329557 A | | 12/2005 |
| JP | 2007331822 A | * | 12/2007 |
| KR | 10-2013-0124190 A | | 11/2013 |
| KR | 10-2014-0118881 A | | 10/2014 |
| KR | 10-2015-0002540 A | | 1/2015 |
| KR | 10-2015-0029367 A | | 3/2015 |
| KR | 10-2016-0088133 A | | 7/2016 |
| KR | 10-2017-0106220 A | | 9/2017 |

OTHER PUBLICATIONS

Shoji Obuchi, Multilayer film, JP 2005-329557 Original and Machine Translation (Year: 2005).*
Film for Packaging Foods, JP 2007-331822 Original and Machine Translation (Year: 2007).*

* cited by examiner

*Primary Examiner* — Heidi R Kelley
*Assistant Examiner* — Surbhi M Du
(74) *Attorney, Agent, or Firm* — Bryan Cave Leighton Paisner LLP

(57) ABSTRACT

The present disclosure relates to a polyalkylene carbonate-based resin having an excellent effect of suppressing a blocking phenomenon as well as excellent mechanical properties and thermal stability, a method of preparing the same, and a molded article prepared from the polyalkylene carbonate-based resin.

10 Claims, No Drawings

POLYALKYLENE CARBONATE-BASED RESIN, AND METHOD OF PREPARING THE SAME

CROSS-REFERENCE TO RELATED APPLICATIONS

This application is a National Phase entry pursuant to 35 U.S.C. § 371 of International Application No. PCT/KR2020/000422, filed on Jan. 9, 2020, and claims the benefit of and priority to Korean Patent Application No. 10-2019-0004135, filed on Jan. 11, 2019, in the Korean Intellectual Property Office, all of which are hereby incorporated by reference in their entirety for all purposes as if fully set forth herein.

TECHNICAL FIELD

The present invention relates to a polyalkylene carbonate-based resin having an excellent effect of suppressing a blocking phenomenon as well as excellent mechanical properties and thermal stability, a method of preparing the same, and a molded article prepared from the polyalkylene carbonate-based resin.

BACKGROUND ART

Synthetic resins are being used as raw materials for various articles due to ease of preparation and convenience of use, and are being used in various fields not only for disposable articles, such as packaging films, disposable cups, and disposable plates, but also for building materials and automotive interior materials.

However, synthetic resins exhibit a blocking phenomenon in which particles themselves are aggregated or undesirably fused. The blocking phenomenon may be usually caused by external conditions, such as temperature and pressure, during storage of the synthetic resin, and, particularly, the blocking phenomenon easily occurs due to lamination or heating during processing. If the blocking phenomenon occurs, a process for partially or completely separating an aggregate may be required, this results in additional labor and cost, and contamination or damage of the resin occurs in the additional process.

Thus, in order to prevent the blocking phenomenon, a method of using a dusting agent, such as carbon black, talc, chalk, and silica, in the preparation of the resin has been attempted, but the dusting agent itself may affect inherent properties of the resin and may cause environmental problems.

Also, there is a method of using olefin-based resins, such as high-density polyethylene or low-density polyethylene, as an anti-blocking agent, but, since these olefin-based resins are hydrophobic, their compatibility with polarized resins is low, and thus, it is difficult to act as the anti-blocking agent. Particularly, since a carbon dioxide-based hydrophilic plastic resin, such as a polyalkylene carbonate resin, has very low compatibility with the olefin-based resin, it is difficult to produce a uniform product during molding and processing when used as the anti-blocking agent.

Furthermore, since the anti-blocking agent is usually in the form of powder, contamination of processing equipment is severe due to scattering of the anti-blocking agent, an addition ratio with respect to the original resin is not uniform due to a small particle size, and the anti-blocking agent may not be uniformly mixed with the original resin. Thus, there is a possibility that an effect of preventing the blocking phenomenon is hardly achieved.

An amount of waste increases as an amount of synthetic resins used increases, and, since most synthetic resins are not decomposed in the natural environment, the waste is mainly treated by incineration, but there is a problem of causing environmental pollution because toxic gases are emitted during the incineration. Thus, biodegradable resins, which are naturally degraded in the natural environment, have recently been developed.

Biodegradable resins are degraded slowly in water due to their chemical structure, wherein, in wet environments such as soil or seawater, the biodegradable resins start to be degraded within a few weeks and disappear within one to several years. In addition, degradation products of the biodegradable resins are less harmful to the environment because they are decomposed into harmless components to the human body, for example, water or carbon dioxide.

PRIOR ART DOCUMENT (Patent Document) KR 2017-0106220 A

DISCLOSURE OF THE INVENTION

Technical Problem

The present invention provides a biodegradable polyalkylene carbonate-based resin having an excellent effect of suppressing a blocking phenomenon as well as excellent mechanical properties and thermal stability.

The present invention also provides a method of preparing the polyalkylene carbonate-based resin.

The present invention also provides a molded article prepared from the polyalkylene carbonate-based resin.

Technical Solution

According to an aspect of the present invention, there is provided a polyalkylene carbonate-based resin including a base resin; and a polylactide resin surrounding a surface of the base resin, wherein the base resin is a polyalkylene carbonate resin; or a polyalkylene carbonate-polylactide mixed resin, and the polylactide resin contains an L-lactide unit and a D-lactide unit, and contains the D-lactide unit in an amount of 10 mol % to 20 mol %.

According to another aspect of the present invention, there is provided a method of preparing the polyalkylene carbonate-based resin which includes: mixing a base resin with a polylactide resin solution; and drying the mixture, wherein the base resin is a polyalkylene carbonate resin; or a polyalkylene carbonate-polylactide mixed resin, the polylactide resin solution is prepared by dissolving a polylactide resin in a polar organic solvent, and the polylactide resin contains an L-lactide unit and a D-lactide unit and contains the D-lactide unit in an amount of 10 mol % to 20 mol %.

According to another aspect of the present invention, there is provided a molded article prepared by using the polyalkylene carbonate-based resin.

Advantageous Effects

Since a polylactide resin containing a specific amount of a D-lactide unit uniformly surrounds a surface of a base resin, which is a polyalkylene carbonate resin or a polyalkylene carbonate-polylactide mixed resin, as a coating layer in a polyalkylene carbonate-based resin according to the present invention, the polyalkylene carbonate-based resin according to the present invention has an excellent effect of suppressing a blocking phenomenon as well as excellent mechanical properties and thermal stability.

Also, since a method of preparing the polyalkylene carbonate-based resin according to the present invention uses the polylactide resin containing the specific amount of the D-lactide unit, the polylactide resin may be easily dissolved in a solvent to uniformly surround the surface of the base resin, and thus, the method may easily prepare a polyalkylene carbonate-based resin having excellent mechanical properties, excellent thermal stability, and an excellent effect of suppressing a blocking phenomenon.

In addition, since a molded article according to the present invention is prepared by using the polyalkylene carbonate-based resin in which the polylactide resin containing the specific amount of the D-lactide unit is formed on the surface of the base resin as a coating layer, mechanical properties and thermal stability may not only be excellent, but the blocking phenomenon occurring during storage and processing may be significantly suppressed.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Term and measurement method used in the present invention may be defined as follows unless otherwise defined.

Term

The term "mixed resin" used in the present invention denotes a material in a state in which two or more resins are combined to obtain physically and chemically excellent properties, wherein, for example, a polyalkylene carbonate-polylactide mixed resin in the present invention may represent a state in which a polyalkylene carbonate resin and a polylactide resin are blended.

[Measurement Method]

In the present invention, "weight-average molecular weight (g/mol)" was measured by gel permeation chromatography (GPC) analysis, wherein, specifically, in the GPC, two PLgel Olexis columns (Polymer Laboratories) and one PLgel mixed-C column (Polymer Laboratories) were combined and used, chloroform was used as a measurement solvent, the measurement was made with a differential refractive index detector (RI) at a flow rate of 1.0 ml/min and a column temperature of 40° C., and polystyrene (PS) was used as a GPC standard material when calculating the molecular weight.

The present invention provides a polyalkylene carbonate-based resin having an excellent effect of suppressing a blocking phenomenon as well as excellent mechanical properties and thermal stability.

The polyalkylene carbonate-based resin according to an embodiment of the present invention includes a base resin; and a polylactide resin surrounding a surface of the base resin, wherein the base resin is a polyalkylene carbonate resin; or a polyalkylene carbonate-polylactide mixed resin, and the polylactide resin contains an L-lactide unit and a D-lactide unit, and contains the D-lactide unit in an amount of 10 mol % to 20 mol %.

Synthetic resins are being used in various fields not only for disposable articles, such as packaging films, disposable cups, and disposable plates, but also for building materials and automotive interior materials due to ease of preparation and convenience of use, and, since an amount of waste increases as an amount of the synthetic resins used increases, it causes environmental pollution problems. Thus, biodegradable resins, which are naturally degraded in the natural environment, have recently been developed. Also, the synthetic resins exhibit a blocking phenomenon during storage and processing, and, in a case in which the blocking phenomenon occurs, additional labor and cost for separation are required, and contamination or damage of the resin occurs in the additional process. Therefore, in order to prevent the blocking phenomenon, a method of using an anti-blocking agent, such as a dusting agent, an olefin-based resin, and oil, has recently been proposed, but an effect of preventing the blocking phenomenon is substantially insignificant, and the anti-blocking agent rather causes environmental problems and deterioration of inherent physical properties of the resin.

However, since the polyalkylene carbonate-based resin according to the present invention includes a polyalkylene carbonate resin or a polyalkylene carbonate-polylactide mixed resin as a base resin and includes a polylactide resin coating layer surrounding a surface of the base resin, an effect of suppressing the blocking phenomenon may be excellent while mechanical properties and thermal stability are excellent. Particularly, since the polyalkylene carbonate-based resin according to the present invention uses a polylactide resin containing a specific amount of a D-lactide unit to form a coating layer surrounding the base resin, the coating layer may be more uniformly formed, and thus, the effect of suppressing the blocking phenomenon may be better.

Specifically, the polyalkylene carbonate-based resin according to the embodiment of the present invention includes a base resin; and a polylactide resin, wherein the polylactide resin may surround the surface of the base resin as a coating layer.

Hereinafter, the polyalkylene carbonate-based resin will be divided into constituents and will be described in detail.

[Base Resin]

In the present invention, the base resin may be a polyalkylene carbonate resin; or a polyalkylene carbonate-polylactide mixed resin.

The polyalkylene carbonate resin is a polymer having a repeating unit of —COO—$(CH_2)_n$—$CH_2CH_2O$— (where n is an integer of 2 to 12), wherein the polyalkylene carbonate resin may specifically include at least one selected from the group consisting of polyethylene carbonate, polypropylene carbonate, polypentene carbonate, polyhexene carbonate, polyoctene carbonate, and polycyclohexene carbonate, and may more specifically include polyethylene carbonate or polypropylene carbonate.

Also, the polyalkylene carbonate may have a weight-average molecular weight of 10,000 g/mol to 1,000,000 g/mol, for example, 50,000 g/mol to 500,000 g/mol or 100,000 g/mol to 200,000 g/mol. In this case, mechanical properties of the polyalkylene carbonate-based resin including the same may be excellent.

The polyalkylene carbonate resin in the present invention may be a copolymer or terpolymer which is prepared by copolymerization using an epoxide-based compound and carbon dioxide as monomers in the presence of an organometallic catalyst in an organic solvent.

In this case, the epoxide-based compound, for example, may include at least one selected from the group consisting of ethylene oxide, propylene oxide, 1-butene oxide, 2-butene oxide, isobutylene oxide, 1-pentene oxide, 2-pentene oxide, 1-hexene oxide, 1-octene oxide, cyclopentene oxide, cyclohexene oxide, styrene oxide, and butadiene monoxide, the carbon dioxide, for example, may be controlled to a pressure of 5 atm to 30 atm, and the copolymerization may be performed at 20° C. to 120° C.

Furthermore, the organic solvent, for example, may include at least one selected from the group consisting of aliphatic hydrocarbons, such as pentane, octane, decane, and cyclohexane, aromatic hydrocarbons, such as benzene, toluene, and xylene, and halogenated hydrocarbons such as chloromethane, methylene chloride, chloroform, carbon tetrachloride, 1,1-dichloroethane, 1,2-dichloroethane, ethylchloride, trichloroethane, 1-chloropropane, 2-chloropropane, 1-chlorobutane, 2-chlorobutane, 1-chloro-2-methylpropane, chlorobenzene, and bromobenzene.

Also, the polyalkylene carbonate-polylactide mixed resin is a blending resin of a polyalkylene carbonate resin and a polylactide resin, wherein, for example, the polyalkylene carbonate-polylactide mixed resin may be prepared by solution mixing of the polyalkylene carbonate resin and the polylactide resin in the presence of a non-halogen ether-based solvent and may include polyalkylene carbonate and polylactide in a weight ratio of 9:1 to 5:5, and, in this case, mechanical properties and thermal stability of the polyalkylene carbonate-based resin including the same may be excellent.

Herein, the non-halogen ether-based solvent is a low-toxicity organic solvent containing no halogen element, wherein the non-halogen ether-based solvent may include at least one selected from the group consisting of 1,3-dioxolane, 1,2-dioxolane, and 1,4-dioxane, and may more specifically include 1,3-dioxolane.

The polyalkylene carbonate resin included in the polyalkylene carbonate-polylactide mixed resin may be the same as described above.

The polylactide resin (polylactic acid) is a polymer prepared by using lactic acid as a monomer, wherein, in the present invention, the polylactide resin constituting the mixed resin may include at least one selected from the group consisting of poly(L-lactide), poly(D-lactide), and poly(L,D-lactide). Herein, the poly(L-lactide) is prepared by using L-lactic acid as a monomer, the poly(D-lactide) is prepared by using D-lactic acid as a monomer, and the poly(L,D-lactide) is prepared by using L- and D-lactic acids together.

Furthermore, the polylactide resin may have a weight-average molecular weight of 50,000 g/mol to 400,000 g/mol, for example, 100,000 g/mol to 250,000 g/mol, and, in this case, mechanical properties may be better.

[Polylactide Resin]

In the present invention, the polylactide resin, as the coating layer surrounding the surface of the base resin, may contain an L-lactide unit and a D-lactide unit, and may contain the D-lactide unit in an amount of 10 mol % to 20 mol %, for example, 12 mol % to 17 mol %.

The polylactide resin is prepared by using lactic acid as a monomer as described above, wherein the D-lactide unit in the polylactide resin may act as a type of impurity, and thus, since the higher the ratio of the D-lactide unit in the polylactide resin is the lower the crystallinity of the polylactide resin is, a glass transition temperature may be decreased and solvent solubility may be increased.

Thus, since the polylactide surrounding the surface of the base resin according to the present invention contains both L-lactic acid- and D-lactic acid-derived units, but contains the D-lactide unit, as the D-lactic acid-derived unit, in a specific ratio, the solvent solubility is excellent while there is no deterioration of physical properties, such as thermal stability and mechanical properties, due to a decrease in the glass transition temperature so that a uniform coating layer may be formed on the surface of the base resin, and, as a result, the effect of suppressing the blocking phenomenon of the polyalkylene carbonate-based resin including the same may be better.

If, in a case in which the amount of the D-lactide unit of the polylactide resin is less than 10 mol %, since the coating layer may not be uniformly formed due to low solvent solubility, the more effective effect of suppressing the blocking phenomenon may not be obtained, and, in a case in which the amount of the D-lactide unit is greater than 20 mol %, deterioration of other physical properties, such as mechanical properties and thermal stability, of the polyalkylene carbonate-based resin including the same may occur.

Also, the polylactide resin may have a weight-average molecular weight of 50,000 g/mol to 200,000 g/mol.

The polyalkylene carbonate-based resin according to the embodiment of the present invention may include the polylactide resin in an amount of 1 part by weight to 10 parts by weight, for example, 2 parts by weight to 5 parts by weight based on 100 parts by weight of the base resin. In this case, the effect of preventing the blocking phenomenon may be excellent while not adversely affecting excellent mechanical properties and thermal stability of the base resin.

Furthermore, the present invention provides a method of preparing the polyalkylene carbonate-based resin.

The method of preparing the polyalkylene carbonate-based resin according to an embodiment of the present invention is characterized in that it includes the steps of: mixing a base resin with a polylactide resin solution (step 1); and drying the mixture (step 2), wherein the base resin is a polyalkylene carbonate resin; or a polyalkylene carbonate-polylactide mixed resin, the polylactide resin solution is prepared by dissolving a polylactide resin in a polar organic solvent, and the polylactide resin contains an L-lactide unit and a D-lactide unit and contains the D-lactide unit in an amount of 10 mol % to 20 mol %.

Step 1 is a step for forming a polylactide resin coating layer on a base resin, wherein it may be performed by mixing the base resin with a polylactide resin solution.

In this case, the base resin is a polyalkylene carbonate resin; or a polyalkylene carbonate-polylactide mixed resin, wherein the polyalkylene carbonate resin and the polyalkylene carbonate-polylactide mixed resin may be the same as described above.

The polylactide resin solution may include the polylactide resin in an amount of 1 wt % to 20 wt %, and may be used in an amount such that the polylactide resin is included in an amount of 1 part by weight to 10 parts by weight based on 100 parts by weight of the base resin.

Also, the polar organic solvent may include at least one selected from the group consisting of tetrahydrofuran, 1,3-dioxolane, and dimethylformamide.

Since the polylactide resin solution according to an embodiment of the present invention uses the polylactide resin containing 10 mol % to 20 mol % of the D-lactide unit, it may have sufficient solubility in the above solvent other than a chlorine-based solvent. Herein, the chlorine-based solvent is commonly known as a solvent that dissolves the polylactide resin and is widely used, but the chlorine-based solvent is harmful to the human body and the environment and is limited in application to food contact products. However, since the preparation method according to the embodiment of the present invention uses the polylactide resin containing 10 mol % to 20 mol % of the D-lactide unit in the preparation of the polylactide resin solution, the solvent, such as tetrahydrofuran, other than the chlorine-based solvent may be used, and thus, there is an advantage that it may be easily applied to the food contact products.

Also, since the base resin according to the present invention is not dissolved in the above-described polar organic solvent such as tetrahydrofuran, an aggregation phenomenon caused by partial dissolution of the base resin in the polylactide resin solution may be prevented, and, as a result, there is an effect that the polylactide resin coating layer is more uniformly and easily formed on the surface of the base resin.

The mixing is not particularly limited, but may be performed while stirring. For example, the stirring may be performed without particular limitation as long as the base resin and the polylactide resin solution are sufficiently mixed so as to form a uniform mixed solution, but the stirring, for example, may be performed at a stirring speed of 50 rpm to 200 rpm in a temperature range of 25° C. to 50° C. for 0.5 hours to 2 hours. In this case, the polylactide resin may be more uniformly formed on the surface of the base resin.

Step 2 is a step for preparing a polyalkylene carbonate-based resin by removing the solvent, wherein the step 2 may be performed by drying after the step 1.

In this case, the drying may be performed by a conventional method without particular limitation as long as it may completely remove only the solvent, but, for example, may be performed in a temperature range of 25° C. to 50° C. under a vacuum condition, and, in this case, only the solvent may be easily removed.

In addition, the present invention provides a molded article prepared by using the above-described polyalkylene carbonate-based resin.

The molded article according to an embodiment of the present invention may be one prepared by processing, such as extruding and injecting, the polyalkylene carbonate-based resin, and, as another example, the molded article may be one prepared by melt mixing other resins with the polyalkylene carbonate-based resin and processing, such as injecting, the melt-mixed resin.

Also, the molded article according to the embodiment of the present invention, for example, may include at least one selected from the group consisting of a film, a packaging material, an oriented film, an injection molded article, a blow molded article, a laminate, a tape, a nonwoven fabric, and a yarn.

Since the molded article according to the present invention is prepared by using the polyalkylene carbonate-based resin, the blocking phenomenon may be significantly improved while mechanical properties and thermal stability are excellent.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Preparation Example

A mixed solution was prepared by stirring until polyethylene carbonate (Mw 140,000 g/mol) and polylactide (PLA 2003D, NatureWorks LLC) were completely dissolved in the presence of 1,3-dioxolane. In this case, the polyethylene carbonate and the polylactide were mixed in a weight ratio of 70:30, the 1,3-dioxolane was removed from the prepared mixed solution by a devolatilization process, and a pellet-type mixed resin (PEC:PLA=7:3 weight ratio) was prepared by using an extruder.

Example 1

The mixed resin prepared in Preparation Example was put in a round-bottom flask and stirred with a bar magnet, and a polylactide resin solution was slowly added while stirring and mixed. In this case, the polylactide resin solution was prepared by adding pellet-type polylactide (containing 17 mol % of D-lactide unit) to tetrahydrofuran such that a solid content was 10 wt % and stirring at room temperature, and the polylactide resin solution was added in an amount such that a polylactide resin was included in an amount of 2 parts by weight based on 100 parts by weight of the mixed resin. Thereafter, polyethylene carbonate-based resin powder was prepared by removing the solvent using vacuum while an internal temperature of the round-bottom flask was constantly maintained at 40° C. using an oil bath, and a pellet-type polyethylene carbonate-based resin was prepared by using an extruder.

Example 2

A pellet-type polyethylene carbonate-based resin was prepared in the same manner as in Example 1 except that a polylactide resin containing 12 mol % of the D-lactide unit was used during the preparation of the polylactide resin solution in Example 1.

Example 3

A pellet-type polyethylene carbonate-based resin was prepared in the same manner as in Example 1 except that polyethylene carbonate having a weight-average molecular weight of 140,000 g/mol was used instead of the mixed resin in Example 1.

Example 4

A pellet-type polyethylene carbonate-based resin was prepared in the same manner as in Example 2 except that polyethylene carbonate having a weight-average molecular weight of 140,000 g/mol was used instead of the mixed resin in Example 2.

Example 5

A pellet-type polyethylene carbonate-based resin was prepared in the same manner as in Example 1 except that the polylactide resin solution was added in an amount such that the polylactide resin was included in an amount of 1 part by weight based on 100 parts by weight of the mixed resin in Example 1.

Comparative Example 1

A pellet-type polyethylene carbonate-based resin was prepared in the same manner as in Example 1 except that a polylactide resin containing 6 mol % of the D-lactide unit was used during the preparation of the polylactide resin solution in Example 1. However, the polylactide resin solution was prepared in the same manner as in Example 1, but a considerable amount of the polylactide resin was not dissolved and remained in the polylactide resin solution, and, thus, in order to remove the remaining polylactide resin, the polylactide resin solution was used after filtration.

Comparative Example 2

A pellet-type polyethylene carbonate-based resin was prepared in the same manner as in Example 1 except that a polylactide resin containing 25 mol % of the D-lactide unit was used during the preparation of the polylactide resin solution in Example 1.

Comparative Example 3

A pellet-type polyethylene carbonate-based resin was prepared in the same manner as in Example 3 except that a polylactide resin containing 6 mol % of the D-lactide unit was used during the preparation of the polylactide resin solution in Example 3. However, the polylactide resin solution was prepared in the same manner as in Example 3, but a considerable amount of the polylactide resin was not dissolved and remained in the polylactide resin solution, and, thus, in order to remove the remaining polylactide resin, the polylactide resin solution was used after filtration.

Comparative Example 4

A pellet-type polyethylene carbonate-based resin was prepared in the same manner as in Example 3 except that a polylactide resin containing 25 mol % of the D-lactide unit was used during the preparation of the polylactide resin solution in Example 3.

Comparative Example 5

The pellet-type mixed resin (PEC:PLA=7:3 weight ratio) prepared in Preparation Example was used as a comparative example.

Comparative Example 6

The polyethylene carbonate having a weight-average molecular weight of 140,000 g/mol used in Example 3 was prepared in the form of a pellet using an extruder and used as a comparative example.

Experimental Example

A glass transition temperature, tensile properties, and a blocking phenomenon of each resin pellet of Examples 1 to 5 and Comparative Examples 1 to 6 were comparatively analyzed, and the results thereof are presented in Tables 1 and 2 below.

(1) Glass Transition Temperature

With respect to the glass transition temperature, a glass transition temperature of the polylactide resin, as a coating layer surrounding the base resin, in each resin pellet was measured.

A differential scanning calorimetry (DSC) curve was recorded according to ISO 22768:2006 while the temperature was increased from −10° C. at a rate of 10° C./min under a helium flow of 50 ml/min using differential scanning calorimetry (DSC3200S, Mc Science Co. Ltd.), and a peak top (inflection point) of the DSC differential curve was set as the glass transition temperature.

(2) Tensile Strength (kgf/cm$^2$)

A T-die film was prepared from each resin pellet of the examples and the comparative examples, and tensile strength was measured using the film.

After 5 dumbbell-shaped samples were prepared according to ASTM D638, tensile strength of each of the 5 samples was measured using UTM-5566 (Universal Testing Machine, Instron) at a speed of 50 mm/min, and each result was presented as an average of the five measurements.

(3) Blocking Phenomenon

After 70 g of each resin pellet under a load of 2 kg was put in a convection oven at 50° C. and heat-treated for 6 hours, a degree of blocking was visually observed and evaluated in four stages of "very good (⊚)", "good (○)", "normal (Δ)", and "poor (x)".

TABLE 1

| Category | Glass transition temperature (° C.) | Tensile strength (kgf/cm$^2$) | Degree of blocking |
| --- | --- | --- | --- |
| Example 1 | 52 | 274 | ⊚ |
| Example 2 | 53 | 248 | ⊚ |
| Example 5 | 52 | 265 | ○ |
| Comparative Example 1 | 55 | 276 | Δ |
| Comparative Example 2 | 50 | 257 | Δ |
| Comparative Example 5 | — | 261 | Δ |

TABLE 2

| Category | Glass transition temperature (° C.) | Tensile strength (kgf/cm$^2$) | Degree of blocking |
| --- | --- | --- | --- |
| Example 3 | 52 | 176 | ⊚ |
| Example 4 | 53 | 170 | ⊚ |
| Comparative Example 3 | 55 | 173 | Δ |
| Comparative Example 4 | 50 | 161 | Δ |
| Comparative Example 6 | — | 179 | x |

As illustrated in Tables 1 and 2, since the blocking phenomenon did not occur in Examples 1 to 5 while Examples 1 to 5 had excellent tensile strengths, it was confirmed that an effect of suppressing the occurrence of the blocking phenomenon was excellent.

Specifically, with respect to the polyethylene carbonate-based resins of Examples 1 to 5 respectively using the polylactide resin solutions in which the polylactides containing 12 mol % to 17 mol % of the D-lactide unit were dissolved, it was confirmed that little or no blocking phenomenon occurred while exhibiting equally excellent tensile strengths in comparison to Comparative Examples 1, 2, and 5 and Comparative Examples 3, 4, and 6, respectively. In contrast, with respect to the polyethylene carbonate-based resins of Comparative Examples 1 to 4 which were prepared under the same conditions as in Examples 1 to 4 except that the polylactide resin solutions, in which the polylactides containing 6 mol % or 25 mol % of the D-lactide unit were dissolved, were used, it was confirmed that the blocking phenomenon occurred.

Accordingly, since the polyalkylene carbonate-based resin according to the present invention includes the polylactide resin containing a specific amount of the D-lactide unit as a coating layer surrounding the surface of the base resin, it was confirmed that the polyalkylene carbonate-based resin according to the present invention may have a significantly improved effect of suppressing the blocking phenomenon while maintaining excellent physical properties, such as mechanical properties, of the base resin. With respect to Comparative Examples 1 and 3, since the polylactide resin was not dissolved in the polylactide resin solution as described above, the filtration was required before use, and, accordingly, it was confirmed that there was a limitation in the use of the polylactide resin containing less than 10 mol % of the D-lactide unit due to low solvent solubility.

The invention claimed is:

1. A polyalkylene carbonate-based resin comprising:
a base resin; and
a polylactide resin surrounding a surface of the base resin,
wherein the polyalkylene carbonate-based resin has a powder form,
wherein the base resin is a polyalkylene carbonate resin; or a polyalkylene carbonate-polylactide mixed resin, and
wherein the polylactide resin contains an L-lactide unit and a D-lactide unit, and contains the D-lactide unit in an amount of 10 mol % to 20 mol %.

2. The polyalkylene carbonate-based resin of claim 1, wherein the polylactide resin has a weight-average molecular weight of 50,000 g/mol to 200,000 g/mol.

3. The polyalkylene carbonate-based resin of claim 1, wherein the polylactide resin is included in an amount of 1 part by weight to 10 parts by weight based on 100 parts by weight of the base resin.

4. The polyalkylene carbonate-based resin of claim 1, wherein the polyalkylene carbonate resin comprises at least one selected from the group consisting of polyethylene carbonate, polypropylene carbonate, polypentene carbonate, polyhexene carbonate, polyoctene carbonate, and polycyclohexene carbonate.

5. The polyalkylene carbonate-based resin of claim 1, wherein the polyalkylene carbonate has a weight-average molecular weight of 10,000 g/mol to 1,000,000 g/mol.

6. The polyalkylene carbonate-based resin of claim 1, wherein the polyalkylene carbonate-polylactide mixed resin comprises polyalkylene carbonate and polylactide in a weight ratio of 9:1 to 5:5.

7. A method of preparing the polyalkylene carbonate-based resin of claim 1, the method comprising:
mixing a base resin with a polylactide resin solution; and drying the mixture,
wherein the base resin is a polyalkylene carbonate resin; or a polyalkylene carbonate-polylactide mixed resin,
wherein the polylactide resin solution is prepared by dissolving a polylactide resin in a polar organic solvent, and
wherein the polylactide resin contains an L-lactide unit and a D-lactide unit, and contains the D-lactide unit in an amount of 10 mol % to 20 mol %.

8. The method of claim 7, wherein the polylactide resin solution comprises the polylactide resin in an amount of 1 wt % to 20 wt %.

9. The method of claim 7, wherein the polylactide resin solution is used in an amount such that the polylactide resin is included in an amount of 1 part by weight to 10 parts by weight based on 100 parts by weight of the base resin.

10. The method of claim 7, wherein the polar organic solvent comprises at least one selected from the group consisting of tetrahydrofuran, 1,3-dioxolane, and dimethylformamide.

* * * * *